United States Patent
Ishizaki

(10) Patent No.: US 10,958,141 B2
(45) Date of Patent: Mar. 23, 2021

(54) AIR CONDITIONING BLOWER MOTOR UNIT

(71) Applicant: KEIHIN CORPORATION, Tokyo (JP)

(72) Inventor: Masaaki Ishizaki, Sakura (JP)

(73) Assignee: KEIHIN CORPORATION, Tokyo (JP)

( * ) Notice: Subject to any disclaimer, the term of this patent is extended or adjusted under 35 U.S.C. 154(b) by 497 days.

(21) Appl. No.: 16/035,104

(22) Filed: Jul. 13, 2018

(65) Prior Publication Data

US 2019/0028005 A1    Jan. 24, 2019

(30) Foreign Application Priority Data

Jul. 18, 2017 (JP) .............................. JP2017-138902

(51) Int. Cl.

| H02K 3/28 | (2006.01) |
|---|---|
| H02K 15/00 | (2006.01) |
| H02K 15/14 | (2006.01) |
| H02K 3/32 | (2006.01) |
| H02K 1/27 | (2006.01) |
| H02K 3/52 | (2006.01) |
| H02K 7/14 | (2006.01) |
| H02K 5/173 | (2006.01) |

(52) U.S. Cl.
CPC ....... *H02K 15/0068* (2013.01); *H02K 1/2786* (2013.01); *H02K 3/28* (2013.01); *H02K 3/32* (2013.01); *H02K 3/522* (2013.01); *H02K 7/14* (2013.01); *H02K 15/14* (2013.01); *H02K 5/1735* (2013.01); *H02K 2203/06* (2013.01)

(58) Field of Classification Search
CPC ... H02K 3/28; H02K 15/0065; H02K 2203/06
See application file for complete search history.

(56) References Cited

U.S. PATENT DOCUMENTS

2017/0331342 A1* 11/2017 Beetz .................. H02K 5/08

FOREIGN PATENT DOCUMENTS

| JP | 2001-309600 | 2/2001 |
|---|---|---|
| JP | 2001-275328 | 10/2001 |

* cited by examiner

*Primary Examiner* — Ramon M Barrera
(74) *Attorney, Agent, or Firm* — Rankin, Hill & Clark LLP

(57) ABSTRACT

Three substrate side terminal members are provided on a circuit substrate on which electronic components for controlling a brushless motor are disposed. Two of the substrate side terminal members protrude on a side in close proximity to bearing retaining members, and the remaining one substrate side terminal member protrudes on a side separated from the bearing retaining members. Ends of flexible wire members, the other ends of which are held in engagement with stator side terminal members, are held in engagement with the three substrate side terminal members.

4 Claims, 4 Drawing Sheets

AIR CONDITIONING BLOWER MOTOR UNIT

CROSS-REFERENCE TO RELATED APPLICATION

This application is based upon and claims the benefit of priority from Japanese Patent Application No. 2017-138902 filed on Jul. 18, 2017, the contents of which are incorporated herein by reference.

BACKGROUND OF THE INVENTION

Field of the Invention

The present invention relates to an air conditioning blower motor unit in which a blower fan is rotated by a brushless motor.

Description of the Related Art

In a vehicle air conditioner, a blower fan that constitutes an air conditioning blower motor unit is rotated, and consequently blowing of air is carried out by the blower fan. The blower fan is rotated under the action of a brushless motor. More specifically, the brushless motor has a stator including electromagnetic coils, and a rotor which functions as a yoke, and includes a cup-shaped rotating disk in which permanent magnets are retained. When an alternating current is applied to energize the electromagnetic coils, an alternating magnetic field is formed between the electromagnetic coils and the permanent magnets. Along therewith, by the rotor being rotated, a rotary shaft that is retained by the rotor, and the blower fan which is attached to the rotary shaft rotate.

An output of the brushless motor, and hence the rotational speed of the blower fan, are controlled by a control circuit that is disposed on a circuit substrate. Electronic components such as capacitors, resistors, switching elements, and the like are provided in the control circuit, and such electronic components are electrically connected with respect to the electromagnetic coils that constitute the brushless motor.

In Japanese Laid-Open Patent Publication No. 2001-309600, an electric motor is disclosed in which electromagnetic coils and lead wires for supplying an alternating current to the electromagnetic coils are connected via terminals provided on a stator insulating member, together with the lead wires being fixed to a lead wire fixing member.

Further, in an electric motor disclosed in Japanese Laid-Open Patent Publication No. 2001-275328, a circuit substrate is mounted on an inner case, which is fixed at a predetermined position in a circuit protective case made up from an upper case and a lower case, and together therewith, a bus bar is embedded in the inner case. Also, a U-shaped vibration damping structure is provided in order to prevent vibrations from the stator from being transmitted to the circuit substrate when the blower fan rotates.

SUMMARY OF THE INVENTION

As described in Japanese Laid-Open Patent Publication No. 2001-309600, when lead wires are led out from a circumferential direction perpendicular to the axial direction of the motor, the lengths of the three (three phase) lead wires are non-uniform. In this case, and in particular, when flexible fine wires which are capable of absorbing vibrations from the motor are adopted as the lead wires, the resistance values of the lead wires become non-uniform, and thus it is difficult to equally energize the respective phases of the U-phase, the V-phase, and the W-phase. Under such circumstances, when controlling the rotational speed of a brushless motor by way of a switching control of a power module or the like, a voltage drop may occur in a phase having a long lead wire. When such a situation arises, the brushless motor does not rotate smoothly, and as a result, fluctuating noise is generated.

In addition, since the lengths of the lead wires are non-uniform, it is necessary to individually manufacture long lead wires and short lead wires. Preparing lead wires in this manner so as to have different lengths is complicated and leads to an increase in costs.

On the other hand, with the configuration described in Japanese Laid-Open Patent Publication No. 2001-275328, manufacturing of the bus bar itself is difficult. In addition, it is inevitable that the bus bar must be bent in a complicated manner according to the orientation of terminal pins that are arranged along a circumference. For this reason, manufacturing of the bus bar is not easy to perform.

A principal object of the present invention is to provide an air conditioning blower motor unit which can be easily controlled.

Another object of the present invention is to provide an air conditioning blower motor unit which enables a reduction in manufacturing costs.

Yet another object of the present invention is to provide an air conditioning blower motor unit which is easy to assemble.

An air conditioning blower motor unit according to an embodiment of the present invention is adapted to rotate a blower fan by a brushless motor having a stator on which there are sequentially provided a U-phase electromagnetic coil region forming a U-phase, a V-phase electromagnetic coil region forming a V-phase, and a W-phase electromagnetic coil region forming a W-phase, each of the electromagnetic coil regions being formed by winding a wire material on insulating materials that cover a stator core, and a rotor in which permanent magnets are retained and which rotates along a circumferential edge of the stator, the air conditioning blower motor unit comprising:

a metallic bearing retaining member retained by the stator, and rotatably supporting a rotary shaft of the brushless motor;

a circuit substrate on which there is provided an electronic component adapted to control the brushless motor;

a support plate on which the bearing retaining member and the circuit substrate are retained at respective positions that do not overlap one another when viewed in plan;

three stator side terminal members delta-connected with electro-deposited parts that are led out from a boundary region between the U-phase electromagnetic coil region and the V-phase electromagnetic coil region, a boundary region between the V-phase electromagnetic coil region and the W-phase electromagnetic coil region, and a boundary region between the W-phase electromagnetic coil region and the U-phase electromagnetic coil region, on end surfaces of the insulating materials on a side facing toward the circuit substrate, and the three stator side terminal members (100a to 100c) are disposed in surrounding relation to the bearing retaining member;

three substrate side terminal members provided on the circuit substrate and electrically connected to the electronic component; and three flexible wire members, which electrically connect the three substrate side terminal members and the three stator side terminal members respectively while the three substrate side terminal members and the three stator side terminal members are capable of being relatively oscillated, thereby forming an energizing circuit from the circuit substrate to the U-phase electromagnetic coil region, the V-phase electromagnetic coil region, and the W-phase electromagnetic coil region;

wherein lengths of the three flexible wire members are equivalent to each other, and an end of one of the flexible wire members is arranged in a direction that is separated from the bearing retaining member more so than the remaining two flexible wire members.

In this manner, by making the lengths of the three flexible wire members uniform with each other, the resistance values of the flexible wire members are made substantially equivalent. For this reason, the respective phases of the U-phase, the V-phase, and the W-phase can be energized in an equivalent manner. As a result, it becomes easy to control the rotational speed of the motor by way of a switching control of a power module or the like.

In addition, in this case, it is possible to manufacture a large number of the flexible wire members, and use a randomly extracted one of the flexible wire members from among the large number of the flexible wire members as any one of the U-phase, the V-phase, and the W-phase. This is because, as described above, the flexible wire members having the same length are used for the U-phase, the V-phase, and the W-phase. In other words, according to the present invention, there is no need to prepare flexible wire members having different lengths for each of the phases. Therefore, manufacturing costs can be reduced.

Further, a so-called mistaken assembly, such as mistakenly using a flexible wire member intended for a certain phase for another different phase, does not occur. Accordingly, assembly of the brushless motor is facilitated.

Furthermore, according to the present invention, an end of one of the flexible wire members is arranged in a direction that is separated from the bearing retaining member more so than the remaining two flexible wire members. Therefore, bending of the flexible wire members in a complicated manner can be avoided. Accordingly, it is possible to avoid a situation in which a deformed portion is formed to such an extent that it interferes with the circuit substrate or the like. Further, for this reason, assembly of the brushless motor is further facilitated.

In addition, since the flexible wire members are used, vibrations generated by the stator are absorbed by the flexible wire members. Therefore, vibrations are less likely to be transmitted to the circuit substrate and the casing. As a result, the air conditioning blower motor unit is kept quiet. In other words, an air conditioning blower motor unit which is superior in terms of quietness can be obtained.

The air conditioning blower motor unit preferably further comprises an insulative support member made of resin, which is disposed on the circuit substrate, and in which portions of the three substrate side terminal members are embedded. In this case, remaining portions of two of the substrate side terminal members may protrude from a side of the insulative support member that is in close proximity to the bearing retaining member, and a remaining portion of the one remaining substrate side terminal member may protrude from a side of the insulative support member that is distanced from the bearing retaining member. The remaining one flexible wire member, the end of which is arranged in a direction that is separated from the bearing retaining member more so than the two flexible wire members, crosses over the insulative support member when the circuit substrate is viewed in plan.

In this case, the three substrate side terminal members can all be provided from the same type of terminal members (metal fittings). Accordingly, the shapes of the three substrate side terminal members are made uniform, together with the distances between the three substrate side terminal members and the three stator side terminal members being equalized. This feature, combined with the fact that the lengths of the three flexible wire members are equivalent to each other, enables the resistance values between each of the substrate side terminal members and the respective stator side terminal members to be made even more uniform.

As a result, it becomes even easier to control the rotational speed of the motor by way of a switching control of a power module or the like.

In addition, since the terminal members that serve as the substrate side terminal members can be provided by common parts for all three phases, for the same reasons as discussed above, assembly of the brushless motor becomes easier.

As a preferable example of the flexible wire members, a twisted wire in which a plurality of fine wires are twisted may be cited. Moreover, if insulative coatings are provided on the flexible wire members, even if a situation occurs in which the flexible wire members come into contact with the circuit substrate or the like when the flexible wire members are bent, a suitable condition is ensured since insulation between the flexible wire members and the circuit substrate is maintained.

According to the present invention, since the lengths of the three flexible wire members are uniform with each other, the resistance values of the flexible wire members are made substantially equivalent, and the respective phases of the U-phase, the V-phase, and the W-phase can be energized equally. Therefore, it becomes easy to control the rotational speed of the motor by way of a switching control of a power module or the like.

In addition, the flexible wire members can be provided by common parts for the U-phase, the V-phase, and the W-phase. For this reason, it is possible to reduce manufacturing costs, together with avoiding the occurrence of a so-called mistaken assembly, and therefore, assembly of the brushless motor is facilitated.

Furthermore, the end of one flexible wire member is arranged in a direction that is separated from the bearing retaining member more so than the remaining two flexible wire members, and therefore, a situation is avoided in which the flexible wire members are bent in a complicated manner to such an extent that they interfere with the circuit substrate or the like. In addition, for this reason, assembly of the brushless motor is further facilitated.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of an air conditioning blower motor unit according to the present invention will be presented and described in detail below with reference to the accompanying drawings. In the following description, the terms "lower" and "upper" correspond to a downward direction (Z1 direction) and an upward direction (Z2 direction) in FIG. 1. Further, the X1 directions given in the respective drawings represent the same direction, and the same feature also applies to the X2, Y1, Y2, Z1, and Z2 directions. Furthermore, the X1 direction and the X2 direction in FIG. 1 are a direction on a back side of the page and a direction on a front side of the page, respectively.

Figure 1:
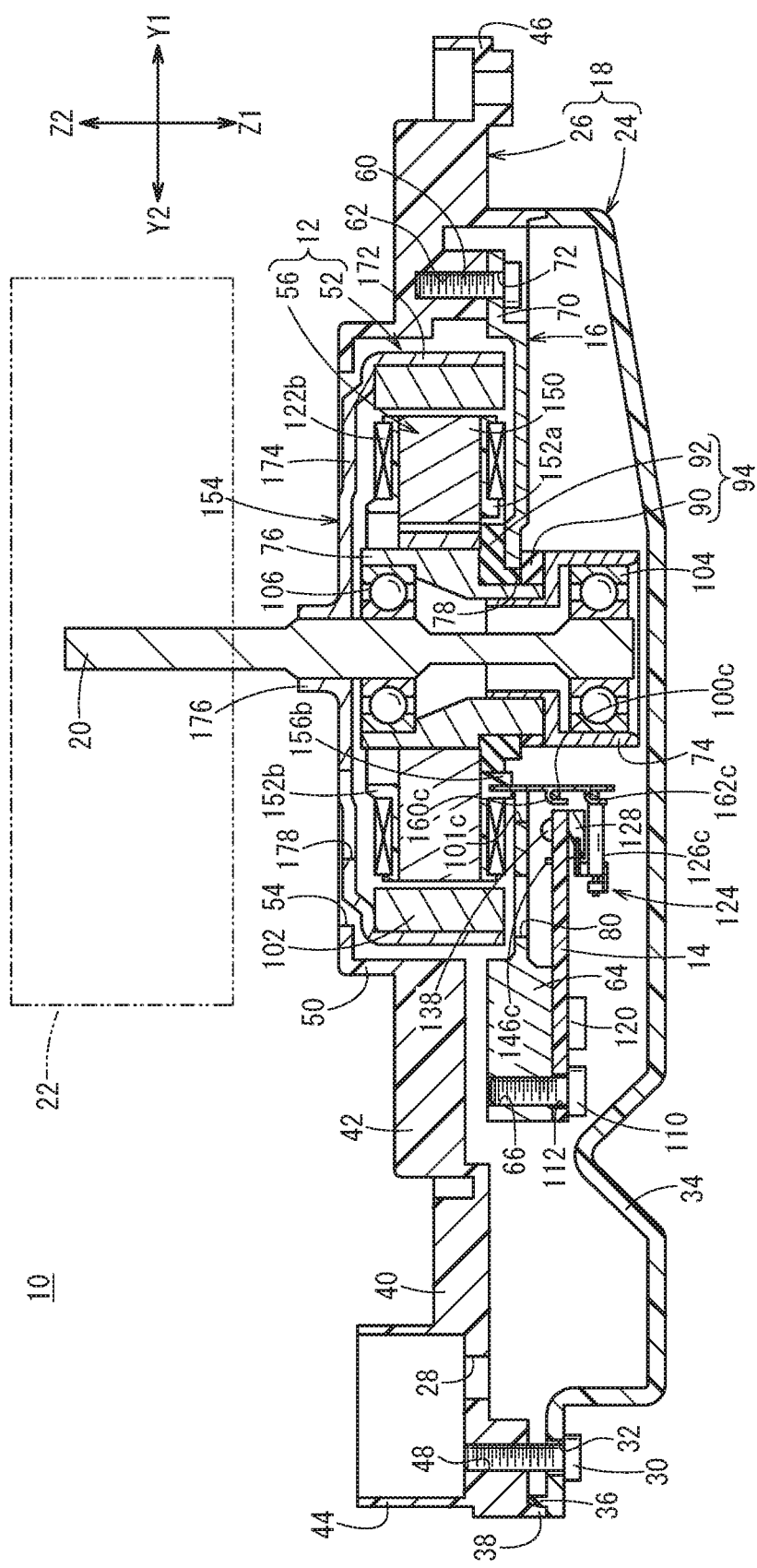
FIG. 1 is a schematic vertical cross-sectional view of an air conditioning blower motor unit according to an embodiment of the present invention.

FIG. 1 is a schematic vertical cross-sectional view of an air conditioning blower motor unit 10 according to an embodiment of the present invention. The air conditioning blower motor unit 10 includes a brushless motor 12, a circuit substrate 14 on which a control circuit is provided for controlling the brushless motor 12, a support plate 16 on which the circuit substrate 14 is supported, and a casing 18 in which the brushless motor 12, the circuit substrate 14, and the support plate 16 are accommodated. A blower fan 22, which is indicated by an imaginary line, is attached to the rotary shaft 20 of the brushless motor 12.

The casing 18 is formed by combining a lower side half body 24 (second casing member) and an upper side half body 26 (first casing member) both of which are made of resin. The lower side half body 24 is a hollow body which is opened on a side facing toward the upper side half body 26, whereas the upper side half body 26 is a hollow body which is opened on a side facing toward the lower side half body 24. More specifically, the lower side half body 24 constitutes a bottom portion, and the upper side half body 26 constitutes a ceiling portion. Accordingly, the casing 18 is also configured as a hollow body, and the hollow interior thereof serves as a flow passage for cooling air that is introduced from an air introduction port 28 formed in the upper side half body 26. The cooling air is an air current, or in other words, an air flow that is generated by the rotating blower fan 22.

A plurality of (for example, three) coupling screw insertion holes 32 are formed in the lower side half body 24 through which coupling screws 30 are passed for connecting the lower side half body 24 to the upper side half body 26. In FIG. 1, only one of the coupling screw insertion holes 32 is shown. Of course, the coupling screw insertion holes 32 are formed at positions that do not disturb the flow of the cooling air. Further, the lower side half body 24 is formed with a protrusion 34 therein having a substantially inverted V-shape by bending a bottom wall portion thereof toward the side of the upper side half body 26. The protrusion 34 functions as a guide member for guiding the cooling air.

In the vicinity of an outer edge portion of an upper side opening of the lower side half body 24, a thin-walled first fitting portion 36 is formed along the outer edge portion. On the other hand, on the lower side opening of the upper side half body 26, a thin-walled second fitting portion 38 is formed along the outer edge portion thereof, and when the upper side half body 26 is assembled onto the lower side half body 24, the second fitting portion 38 surrounds the first fitting portion 36. More specifically, an outer surface of the first fitting portion 36 and an inner surface of the second fitting portion 38 are brought into contact with each other. Consequently, the lower side half body 24 and the upper side half body 26 engage mutually with one another.

A duct 44 connected to a so-called scroll-shaped fan casing (not shown) and which surrounds a predetermined member, for example, the blower fan 22, is erected in the vicinity of the air introduction port 28 of the upper side half body 26. A plurality of (for example, three) stay members 46 for connecting the air conditioning blower motor unit 10 to the fan casing are provided on a circumferential edge portion of the upper side half body 26.

Coupling screw insertion holes 48 are provided in locations corresponding to the coupling screw insertion holes 32. More specifically, the coupling screws 30 which are passed through the coupling screw insertion holes 32 are screwed-engaged with the coupling screw insertion holes 48. Consequently, the lower side half body 24 and the upper side half body 26 are connected with one another to thereby constitute the casing 18.

An annular protrusion 50 is formed in an upwardly protruding manner on the upper side half body 26. A rotary shaft insertion opening 54 having a larger diameter than a rotor 52, to be described later, is formed in the annular protrusion 50. The rotary shaft 20 of the brushless motor 12 is exposed from the rotary shaft insertion opening 54. On the other hand, a stator 56 and the rotor 52 that constitute the brushless motor 12, and the circuit substrate 14 and the like that control the brushless motor 12 are accommodated in the casing 18 together with the support plate 16. Furthermore, support screw holes 62 for screw-engagement with support screws 60, to be described later, are formed on a surface (i.e., a rear surface) of the upper side half body 26 that faces toward the lower side half body 24.

The support plate 16 is made of a thin-walled metal. Approximately one half of the substantially disc-shaped support plate 16 forms an overlapping portion that overlaps with the circuit substrate 14. A heat sink 64 is integrally provided on the overlapping portion. The heat sink 64 is a heat radiating member having a large surface area by erecting a plurality of fins (not shown) thereon. More specifically, dissipation of heat from the circuit substrate 14 and which is transmitted to the support plate 16 is promoted by the heat sink 64.

The support plate 16 is accommodated inside the casing 18 at a posture by which a lower surface of the heat sink 64 faces toward the side of the protrusion 34, and the fins face toward the upper side half body 26. On the heat sink 64 and at a few other locations (two locations in the present embodiment), mounting screw holes 66 are formed so as to extend from the side facing toward the lower side half body 24 to the side facing toward the upper side half body 26.

Further, a plurality of (for example, three) screw mounts 70, which are spaced apart from each other at a predetermined angle, protrude from an outer edge of the support plate 16. In FIG. 1, only one of the screw mounts 70 is shown. Support screw insertion holes 72 are formed in the screw mounts 70, and support screws 60 for attaching, positioning and fixing the support plate 16 to the upper side half body 26 are passed through the support screw insertion holes 72.

Figure 4:
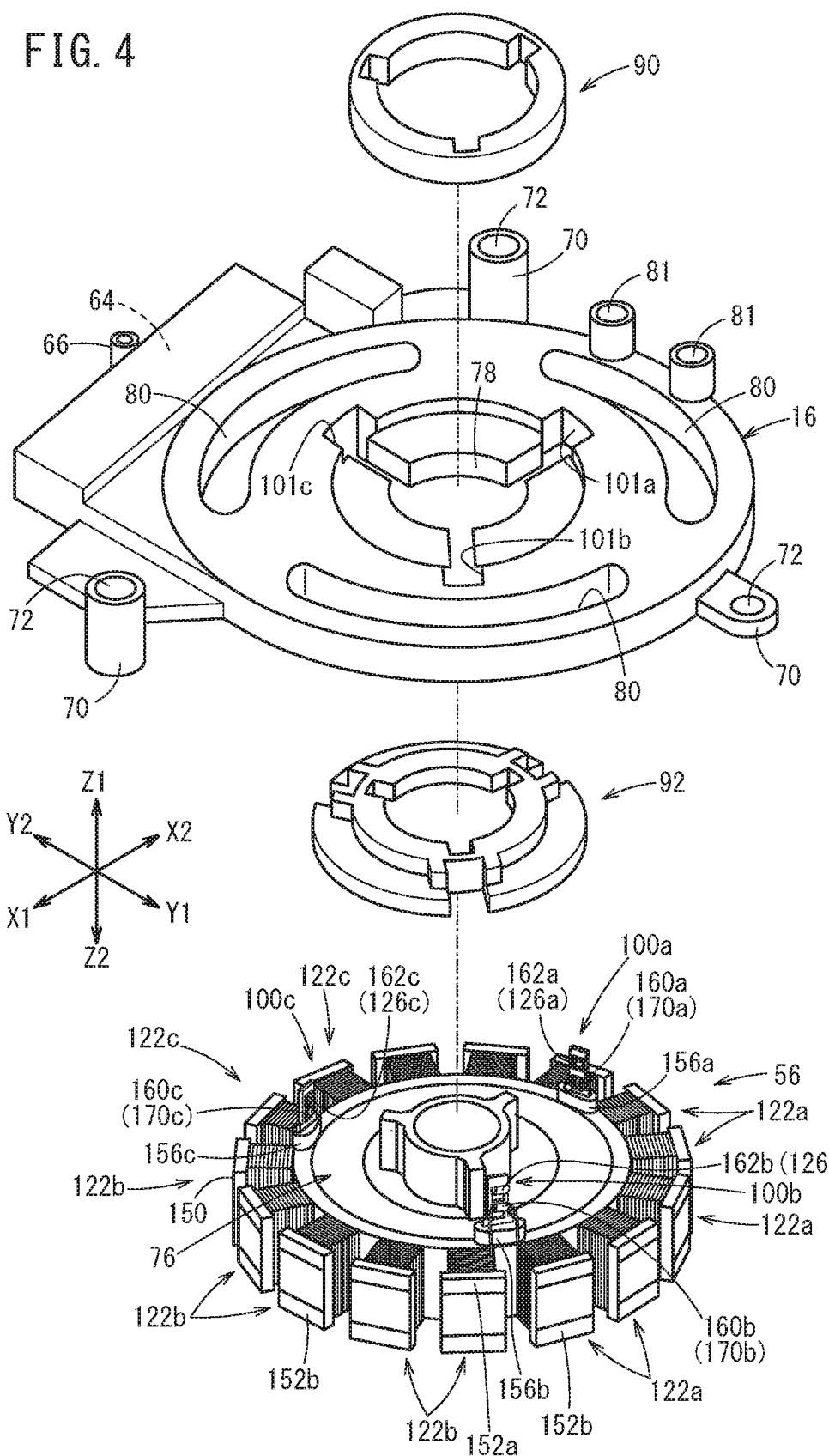
FIG. 4 is an overall exploded perspective view of a stator that constitutes the air conditioning blower motor unit shown in FIG. 1.

Furthermore, at the center of the support plate 16, a retaining hole 78 in which a first bearing holder 74 and a second bearing holder 76, which are made of metal and serve as bearing retaining members, are formed, and together therewith, a plurality of (in the present embodiment, three) ventilation holes 80 are formed to extend in arcuate shapes around the retaining hole 78. In the vicinity of one of the ventilation holes 80, cylindrical screw members 81 are formed as shown in FIG. 4.

A rubber assembly 94, in which a first vibration isolating rubber member 90 and a second vibration isolating rubber member 92 are combined, is fitted into the retaining hole 78. Further, a first notch portion 101a, a second notch portion 101b, and a third notch portion 101c, through which a first stator side terminal member 100a, a second stator side terminal member 100b, and a third stator side terminal member 100c are inserted respectively, are formed in the retaining hole 78 so as to have a phase difference of approximately 120 degrees mutually therebetween.

Furthermore, as shown in FIG. 1, the ventilation holes 80 are positioned substantially directly below a plurality of permanent magnets 102 which are arranged annularly and constitute the rotor 52. In other words, the ventilation holes 80 are curved in arcuate shapes along the arrangement of the permanent magnets 102.

The support plate 16 which is configured in the manner described above can be obtained as a cast product made, for example, from an aluminum alloy. A coupler housing for insertion of a wire harness provided on the side of a vehicle body (neither of which is shown) is supported on the support plate 16 by screw-engagement of retaining screws into the cylindrical screw members 81 disposed in the vicinity of the ventilation hole 80. The coupler housing is made of resin and possesses an insulating property. Moreover, the wire harness is electrically connected to non-illustrated conductive members, the distal ends of which protrude into the coupler housing.

In this instance, the first bearing 104 and a non-illustrated wave washer are inserted into a large diameter lower end of the first bearing holder 74, whereas an upper end on a side facing toward the second bearing holder 76 is set to be smaller in diameter than the lower end. Further, a second bearing 106 is press-fitted into a large diameter upper end of the second bearing holder 76, whereas a lower end on a side facing toward the first bearing holder 74 is set to be smaller in diameter than the upper end. Further, the first bearing holder 74 is press-fitted into the lower end on the side facing toward the first bearing holder 74.

The rubber assembly 94 is gripped on the support plate 16, and positioned in the retaining hole 78 by a stepped portion formed by differences in the diameters, respectively, of the lower end and the upper end of the press-fitted first bearing holder 74 and the second bearing holder 76. As a result, the first bearing holder 74 and the second bearing holder 76, which serve as bearing retaining members, are elastically retained on the support plate 16 via the rubber assembly 94.

The rotary shaft 20 of the brushless motor 12 is rotatably supported by the first bearing holder 74 and the second bearing holder 76 via the first bearing 104 and the second bearing 106.

The circuit substrate 14 assumes a substantially semicircular shape that overlaps with approximately one half of the support plate 16, and a portion having a substantially linear shape is arranged to face toward a side of the first bearing holder 74. Therefore, the circuit substrate 14 does not overlap with (cover), and does not surround the rotary shaft 20 or the bearing retaining members as viewed in plan.

More specifically, the bearing retaining members and the circuit substrate 14 are retained by the support plate 16 at positions that do not overlap with each other. Moreover, the circuit substrate 14 is of a sensorless control type, which does not require a rotation detecting sensor in order to control the brushless motor 12. Therefore, there is no need to provide a rotation detecting sensor on the circuit substrate 14 in the vicinity of the rotary shaft 20 for detecting a rotational angle state of the rotary shaft 20. Accordingly, the bearing retaining members and the circuit substrate 14 can easily be separated from each other.

Mounting screw insertion holes 112 through which mounting screws 110 are passed are formed in the circuit substrate 14. The positions of the mounting screw insertion holes 112 correspond to the positions of the mounting screw holes 66 formed in the heat sink 64 (on a rear surface of the fins). The circuit substrate 14 is supported on the support plate 16 by the passing of the mounting screws 110 through the mounting screw insertion holes 112 and together therewith, screw-engagement of the mounting screws 110 in the mounting screw holes 66. The circuit substrate 14 is indirectly supported on the casing 18 via the support plate 16, however, the circuit substrate 14 is not directly connected to the casing 18.

Various electronic components 120 such as capacitors, resistors, switching elements and the like are provided on the circuit substrate 14, together with conductive paths formed by non-illustrated wirings to thereby constitute the control circuit. The control circuit implements controls such as controlling the rotational speed of the rotary shaft 20.

The conductive members are electrically connected to the wirings. Energization (supply of electrical current) to the control circuit is performed via the conductive members. The conductive members are fixed to an upper side (upper surface) of the circuit substrate 14 with solder or the like, and the conductive members protrude from the circuit substrate 14, and as described above, distal end sides of the protruding conductive members are accommodated in the coupler housing.

On the other hand, from the control circuit, supply of current to the U-phase electromagnetic coil region 122a, the V-phase electromagnetic coil region 122b, and the W-phase electromagnetic coil region 122c that constitute the stator 56 (refer in particular to FIG. 4) is carried out via first through third conductive wires 126a to 126c which are disposed on a conduction unit 124. As shown in detail in FIG. 2, the conduction unit 124 is configured to include an insulative support member 128, and first through third substrate side terminal members 130a to 130c.

The insulative support member 128 is made of, for example, a resin material such as polybutylene terephthalate (PBT), and is of a shape in which a trapezoidal portion 134 protrudes from a side surface of an elongate flat plate-shaped portion 132. A screw receiving portion 136 that protrudes in the Z1 direction is provided in the flat plate-shaped portion 132. A non-illustrated screw hole which extends from the Z2 direction toward the Z1 direction is formed in the screw receiving portion 136, together with a fixing screw 138 (see FIG. 1) being screw-engaged in the screw hole for positioning and fixing the insulative support member 128 on the circuit substrate 14.

The insulative support member 128 is positioned and fixed to the circuit substrate 14 in a manner so that the flat plate-shaped portion 132 is in close proximity to a bearing support member, and the trapezoidal portion 134 is located on a side separated from the bearing support member. The first substrate side terminal member 130a and the second substrate side terminal member 130b protrude from the flat plate-shaped portion 132 so as to be oriented toward the bearing support member, and the third substrate side terminal member 130c protrudes from the trapezoidal portion 134 so as to be distanced with respect to the bearing support member.

Figure 2:
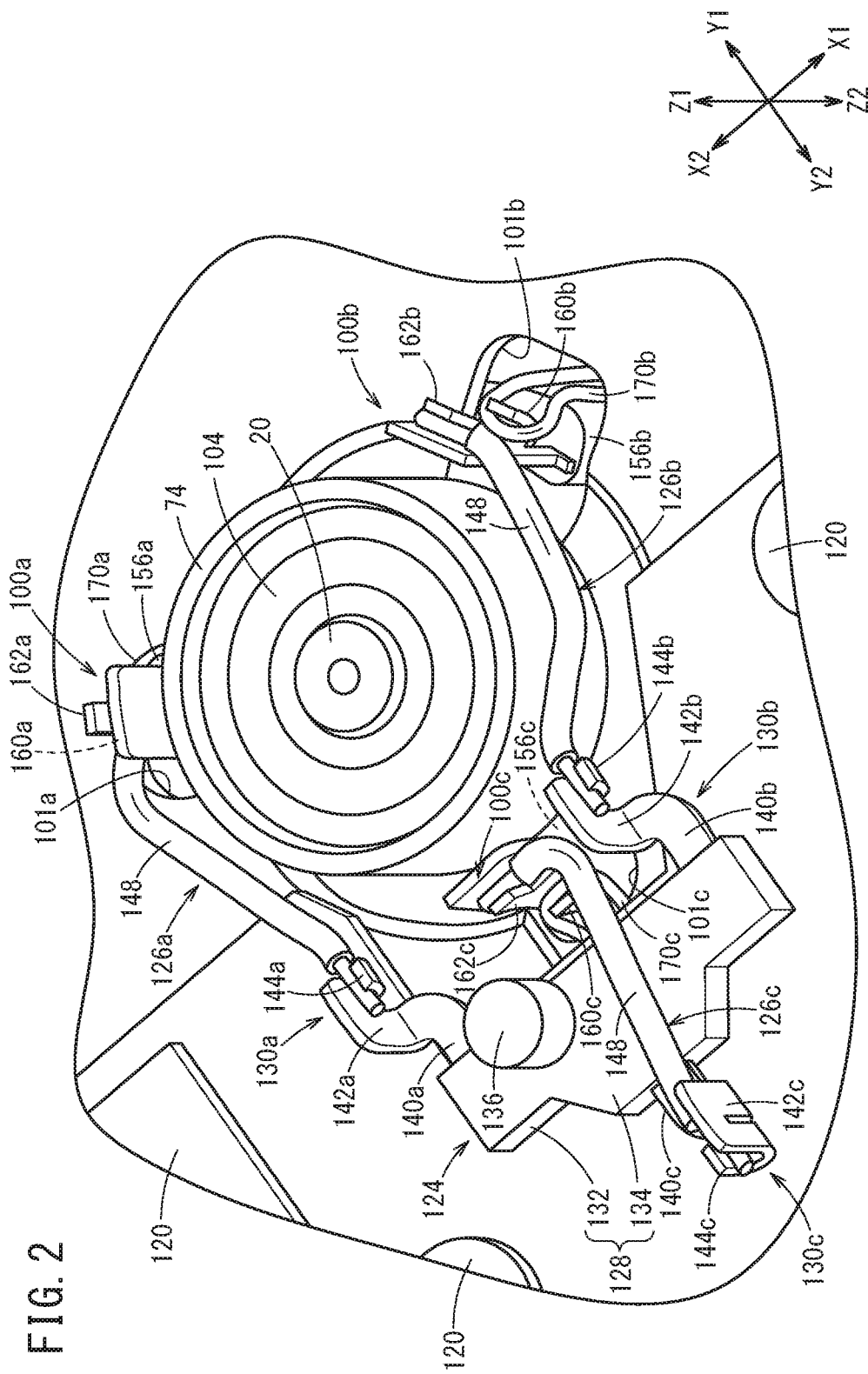
FIG. 2 is a schematic perspective view of principal components of the air conditioning blower motor unit shown in FIG. 1.
Figure 3:
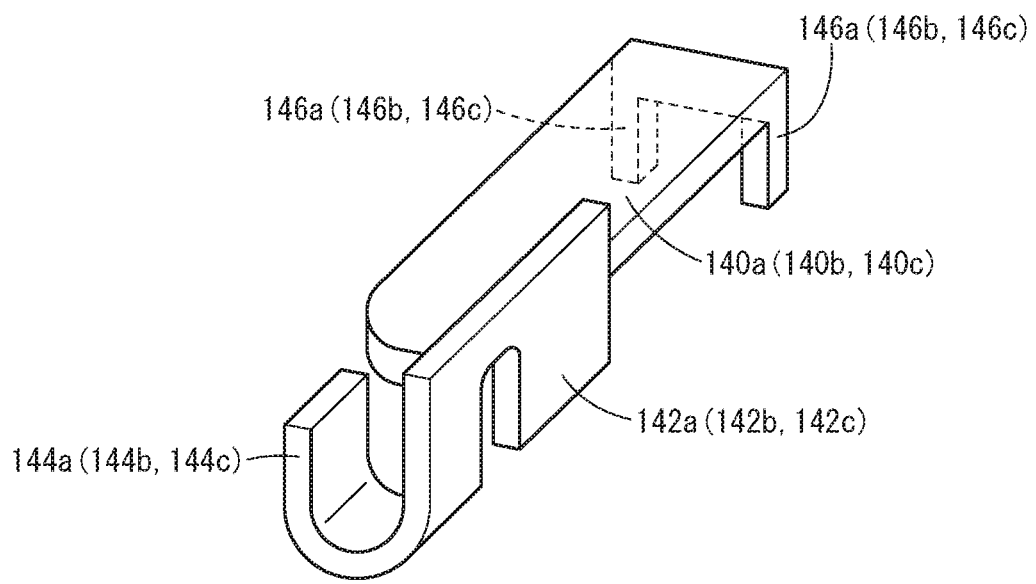
FIG. 3 is an overall schematic perspective view of a terminal member constituting a conduction unit.
Figure 3:
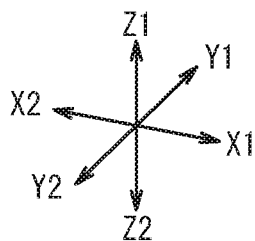

The first through third substrate side terminal members 130a to 130c are made up from terminal members having the same shape, as shown in FIGS. 2 and 3. To provide a brief description of the first substrate side terminal member 130a, the first substrate side terminal member 130a includes a base portion 140a, a proximal end side of which faces toward the insulative support member 128, an arm portion 142a continuous with a side surface of the base portion 140a and which extends substantially vertically downward (toward the Z1 direction), and a substantially U-shaped first hook portion 144a provided on a distal end of the arm portion 142a. A branched portion 146a, which rises upward in a substantially vertical direction (toward the Z2 direction) and is continuous with the base portion 140a, branches in a bifurcated manner for insertion into a pair of (two individual) through holes formed in the circuit substrate 14.

Concerning the remaining second substrate side terminal member 130b and the third substrate side terminal member 130c, for convenience of explanation and to clearly distinguish them from each other, portions thereof corresponding to the portions of the first substrate side terminal member 130a are designated by the subscripts "b" or "c" in place of the subscript "a", and detailed description of such portions will be omitted.

As can be appreciated from FIG. 2, concerning the first through third substrate side terminal members 130a to 130c, the majority of the base portions 140a to 140c thereof are embedded in the insulative support member 128, and the branched portions 146a to 146c, the arm portions 142a to 142c, and the first hook portions 144a to 144c thereof are exposed from the insulative support member 128. As described above, the arm portions 142a, 142b and the first hook portions 144a, 144b are exposed in a direction (Y1 direction) from the flat plate-shaped portion 132 of the insulative support member 128 toward the bearing retaining member, and the arm portion 142c and the first hook portion 144c are exposed in a direction (Y2 direction) from the trapezoidal portion 134 of the insulative support member 128 away from the bearing retaining member. Further, the branched portions 146a to 146c are exposed upwardly of the insulative support member 128 (see FIG. 1).

Ends of the first through third conductive wires 126a to 126c are engaged with and electro-deposited (fused) to the first hook portions 144a to 144c. Moreover, the other ends of the first through third conductive wires 126a to 126c are engaged with and electro-deposited to the third hook portions 162a to 162c on lower sides of the first through third stator side terminal members 100a to 100c.

The first through third conductive wires 126a to 126c are constituted from a plurality of twisted fine wires (copper wires or the like), or in other words, so-called twisted wires. Insulative coatings 148 are provided on the first through third conductive wires 126a to 126c.

The lengths of the first through third conductive wires 126a to 126c when the wires are linearly extended are substantially equivalent. The first through third conductive wires 126a to 126c are appropriately bent so that ends thereof are held in engagement with the first hook portions 144a to 144c, and the other ends thereof are held in engagement with the third hook portions 162a to 162c.

The third stator side terminal member 100c with which the other end of the third conductive wire 126c is held in engagement is located at a position in closer proximity to the conduction unit 124 than the first stator side terminal member 100a and the second stator side terminal member 100b. On the other hand, the third substrate side terminal member 130c is separated at a distance away from the bearing retaining member. Therefore, the distance between the third stator side terminal member 100c and the third substrate side terminal member 130c is substantially the same as the distance between the first stator side terminal member 100a and the first substrate side terminal member 130a, and the distance between the second stator side terminal member 100b and the second substrate side terminal member 130b. Accordingly, after being bent, the lengths of the first through third conductive wires 126a to 126c can be made substantially equivalent.

As discussed above, the one end of the third conductive wire 126c is disposed on the trapezoidal portion 134 of the insulative support member 128, which is separated from the bearing retaining member, and is held in engagement with the third substrate side terminal member 130c that protrudes in a direction away from the bearing retaining member. Therefore, the third conductive wire 126c crosses over the insulative support member 128 when the circuit substrate 14 is viewed in plan (see FIG. 2).

As shown in FIG. 1, the brushless motor 12 includes the stator 56, which is positioned and fixed to an outer circumferential wall of the second bearing holder 76, and the rotor 52, which is held on the rotary shaft 20 and rotates integrally with the rotary shaft 20. Among these constituent elements, as shown in FIG. 4, the stator 56 includes a yoke portion, which is a member having an annular shape, and into which the second bearing holder 76 is press-fitted, and a laminated core 150 (stator core) having teeth portions which are formed to project out radially from an outer circumference of the yoke portion in directions perpendicular to the axis of the rotary shaft 20. The laminated core 150 is sandwiched from above and below by pairs of insulators 152a and 152b (insulating materials).

The yoke portion has an annular shape on the inner circumferential side of the laminated core 150, and is firmly positioned and fixed to an outer circumferential wall of the second bearing holder 76. On the other hand, the teeth portions face toward an inner circumferential wall of a rotary disc 154 constituting the rotor 52. More specifically, in this case, the brushless motor 12 is a so-called outer rotor type of motor in which the rotor 52 is positioned outside the stator 56.

The adjacent teeth portions are mutually separated from each other by a predetermined interval. In other words, a clearance is formed between each of the teeth portions. The clearances act as passageways through which the cooling air passes.

As shown in FIGS. 1 and 2, on the insulators 152a below the laminated core 150 that faces toward the support plate 16, there are provided, respectively, first through third terminal embedded portions 156a to 156c that extend toward the support plate 16 and the circuit substrate 14. Portions of the first through third stator side terminal members 100a to 100c are embedded respectively in the first through third terminal embedded portions 156a to 156c. In addition, the remaining portions of the first through third stator side terminal members 100a to 100c protrude respectively from each of the first through third terminal embedded portions 156a to 156c so as to be oriented toward the lower side half body 24, together with being inserted into the first notch portion 101a, the second notch portion 101b, and the third notch portion 101c that are formed in the support plate 16.

Portions of each of the first through third stator side terminal members 100a to 100c, which are exposed from the first through third terminal embedded portions 156a to 156c, include a second hook portion and a third hook portion thereon that project out as tongue parts. Hereinafter, in order to facilitate understanding, the second hook portion and the third hook portion of the first stator side terminal member 100a will be designated by reference numerals 160a and 162a, the second hook portion and the third hook portion of the second stator side terminal member 100b will be designated by reference numerals 160b and 162b, and the second hook portion and the third hook portion of the third stator side terminal member 100c will be designated by reference numerals 160c and 162c.

The stator 56 is further equipped with a U-phase electromagnetic coil region 122a, a V-phase electromagnetic coil region 122b, and a W-phase electromagnetic coil region 122c, which are wound around the teeth portions of the laminated core 150 via the insulators 152a and 152b. The U-phase electromagnetic coil region 122a is composed of an odd number of U phase electromagnetic coils forming the U-phase, and in the same manner, the V-phase electromagnetic coil region 122b and the W-phase electromagnetic coil region 122c are composed of an odd number of V-phase electromagnetic coils forming the V-phase, and an odd number of W-phase electromagnetic coils forming the W-phase. In the present embodiment, the U-phase electromagnetic coils, the V-phase electromagnetic coils, and the W-phase electromagnetic coils are present in the form of five individual coils each.

Moreover, the U-phase electromagnetic coil region 122a, the V-phase electromagnetic coil region 122b, and the W-phase electromagnetic coil region 122c are formed by sequentially bridging one wire material over all of the teeth portions thereof. In addition, a latching member 170b in the form of an electro-deposited part is led out from a boundary region between the U-phase electromagnetic coil region 122a and the V-phase electromagnetic coil region 122b. In the same manner, a latching member 170c and a latching member 170a are led out at a boundary region between the V-phase electromagnetic coil region 122b and the W-phase electromagnetic coil region 122c, and at a boundary region between the W-phase electromagnetic coil region 122c and the U-phase electromagnetic coil region 122a.

The first terminal embedded portion 156a and the first stator side terminal member 100a are disposed at the boundary region between the W-phase electromagnetic coil region 122c and the U-phase electromagnetic coil region 122a. Further, the second terminal embedded portion 156b and the second stator side terminal member 100b are disposed at the boundary region between the U-phase electromagnetic coil region 122a and the V-phase electromagnetic coil region 122b. Further, the third terminal embedded portion 156c and the third stator side terminal member 100c are disposed at the boundary region between the V-phase electromagnetic coil region 122b and the W-phase electromagnetic coil region 122c.

As will be discussed later, the latching member 170a is hooked over and subjected to electro-deposition on the second hook portion 160a of the first stator side terminal member 100a. Further, the latching members 170b and 170c are hooked over and subjected to electro-deposition, respectively, on the second hook portion 160b of the second stator side terminal member 100b, and on the second hook portion 160c of the third stator side terminal member 100c. Consequently, a so-called delta-connection is made.

As noted previously, the first through third stator side terminal members 100a to 100c are passed through the first notch portion 101a, the second notch portion 101b, and the third notch portion 101c that are formed in the support plate 16, and are exposed downwardly of the support plate 16 (see FIG. 2). Along with exposure thereof, when the circuit substrate 14 is retained on the support plate 16, the third hook portions 162a to 162c of the first through third stator side terminal members 100a to 100c are positioned slightly lower than the circuit substrate 14.

Then, ends of the first through third conductive wires 126a to 126c are held in engagement on the first hook portions 144a to 144c of the first through third substrate side terminal members 130a to 130c. In addition, the other ends of the first through third conductive wires 126a to 126c are held in engagement on the third hook portions 162a to 162c of the first through third stator side terminal members 100a to 100c.

By performing the above-described latching and electro-deposition (fusing) procedure, electrical connections are made between the respective members. More specifically, the latching member 170a is electrically connected to the first conductive wire 126a via the first stator side terminal member 100a. Similarly, the latching member 170b is electrically connected to the second conductive wire 126b via the second stator side terminal member 100b, and the latching member 170c is electrically connected to the third conductive wire 126c via the third stator side terminal member 100c.

The rotor 52 includes the rotary disc 154 as shown in FIG. 1. The rotary disc 154 is supported on the rotary shaft 20 which is inserted for rotation in the first bearing holder 74 and the second bearing holder 76. The rotary disc 154 is formed with a bottomed cup shape having a side wall portion 172 and a circular bottom surface 174, and on an inner surface of a side wall portion 172, which is formed so as to hang down substantially vertically from the circular bottom surface 174, a plurality of permanent magnets 102 are held in an annular shape in facing relation to the teeth portions of the stator 56. When the rotary disc 154 is rotated together with the rotary shaft 20, the permanent magnets 102 also rotate together integrally with the rotary disc 154.

The circular bottom surface 174 of the rotary disc 154 faces upward, and the circular bottom surface 174 is exposed together with the rotary shaft 20 from the rotary shaft insertion opening 54 that is formed in the annular protrusion 50 of the upper side half body 26. A predetermined clearance is formed between the annular protrusion 50 and the circular bottom surface 174. Moreover, as can be appreciated from FIG. 1, the side wall portion 172 is surrounded by the rotary shaft insertion opening 54 and is not exposed to the exterior of the air conditioning blower motor unit 10.

Furthermore, on the circular bottom surface 174, a rotary shaft supporting member 176, which is disposed at a center portion through which the rotary shaft 20 with the blower fan 22 provided thereon is passed, is provided as an annular protrusion, and together therewith, a plurality of ventilation openings 178 are formed in the circular bottom surface 174 in facing relation to the teeth portions.

The air conditioning blower motor unit 10 according to the present embodiment is basically constructed in the manner described above. Next, operations and advantageous effects of the air conditioning blower motor unit 10 will be described.

The air conditioning blower motor unit 10 is assembled in the following manner. More specifically, initially, the laminated core 150 is covered by the insulators 152a and the insulators 152b in which portions of the first through third stator side terminal members 100a to 100c are exposed from the first through third terminal embedded portions 156a to 156c. Thereafter, the wire material (winding) is wound around the teeth portions via the insulators 152a and 152b, thereby forming an electromagnetic coil.

In this case, for example, at first, a starting end portion of the wire material is provisionally engaged with the second hook portion 160a of the first stator side terminal member 100a, and subsequently, the wire material is wound around one of the teeth portions in close proximity to the second hook portion 160a. In this manner, when the winding with respect to the one teeth portions is completed, the wire material is bridged over and wound on an adjacent one of the teeth portions. This operation is repeated to form five electromagnetic coils, and thereby result in the U-phase electromagnetic coil region 122a.

Next, the latching member 170b is formed by pulling out the bridged-over wire from the U-phase electromagnetic coil region 122a, and the latching member 170b is latched over the second hook portion 160b of the second stator side terminal member 100b which is provided at the boundary region between the U-phase electromagnetic coil region 122a and the V-phase electromagnetic coil region 122b. Subsequently, the wire material (winding) is wound around the teeth portions adjacent to the second hook portion 160b to further form five electromagnetic coils, and thereby result in the V-phase electromagnetic coil region 122b. Thereafter, in substantially the same manner, the latching member 170c, the W-phase electromagnetic coil region 122c, and the latching member 170a are formed in succession. Moreover, a terminal end portion of the wire material that has been wound around all the teeth portions is placed in engagement with the second hook portion 160a so as to overlap with the starting end portion and thereby constitute the latching member 170a.

Thereafter, the latching members 170a to 170c are subjected to electro-deposition and are fixed to the respective second hook portions 160a to 160c.

Further, the second bearing holder 76 is press-fitted into an inner hole of the yoke portion which is formed with an annular shape on an inner circumferential side of the laminated core 150. Thereafter, the second vibration isolating rubber member 92 is externally fitted over a small diameter lower end of the second bearing holder 76, and furthermore, the retaining hole 78 of the support plate 16 is fitted onto a relatively small diameter portion of the second vibration isolating rubber member 92.

Thereafter, the first vibration isolating rubber member 90 is combined with the second vibration isolating rubber member 92. In a state with the rubber assembly 94 fitted onto the support plate 16, the small diameter upper end of the first bearing holder 74 is press-fitted into the small diameter lower end of the second bearing holder 76. Consequently, the bearing retaining member is elastically supported on the support plate 16 via the rubber assembly 94.

Next, the second bearing 106 is press-fitted into the inner hole of the second bearing holder 76, and further, the rotary shaft 20 on which the rotor 52 is held is press-fitted into the inner hole of the second bearing 106. Thereafter, a wave washer is inserted from below into the inner hole of the first bearing holder 74. In addition, the first bearing 104 is press-fitted onto the rotary shaft 20, and together therewith, the first bearing 104 is inserted into the inner hole of the first bearing holder 74 in a manner so as to sandwich and grip the wave washer.

Consequently, the brushless motor 12 is constituted in which the rotor 52 (i.e., the permanent magnets 102) surrounds the outer edge of the stator 56. More specifically, the permanent magnets 102, which constitute the rotor 52 by being supported on the inner surface of the side wall portion 172 of the rotary disc 154, are placed in facing relation to the laminated core 150 of the stator 56.

Thereafter, the coupler housing that constitutes a coupler unit is connected to the support plate 16 by screw-engagement of the retaining screws into the cylindrical screw members 81 in a manner so as to protrude from the circuit substrate 14. In this manner, the coupler housing is provided on the support plate 16, and is not disposed on the circuit substrate 14. Therefore, since a mounting space for the electronic components 120 on the circuit substrate 14 is ensured to be sufficiently large, a so-called dead space is unlikely to occur on the circuit substrate 14. In addition, the coupler housing does not overlap with the rotary shaft 20 when viewed in plan.

The assembly of the brushless motor 12 and the support plate 16, which is obtained in the manner described above, is assembled onto the upper side half body 26. More specifically, the support screws 60 are passed through the support screw insertion holes 72 of the screw mounts 70, and are screwed into the support screw holes 62, thereby connecting the support plate 16 to the upper side half body 26. At the same time, the rotary shaft 20 and the circular bottom surface 174 of the rotary disc 154 are exposed from the rotary shaft insertion opening 54 of the upper side half body 26.

Apart from the aforementioned steps, by performing injection molding or the like, the insulative support member 128 is obtained having the flat plate-shaped portion 132 in which parts of the base portions 140a, 140b of the first substrate side terminal member 130a and the second substrate side terminal member 130b are embedded, and the trapezoidal portion 134 in which a part of the base portion 140c of the third substrate side terminal member 130c is embedded. Thereafter, the ends of the first through third conductive wires 126a to 126c are placed in engagement with the first through third substrate side terminal members 130a to 130c and subjected to electro-deposition. Thus, in the foregoing manner, the conduction unit 124 is constructed.

In this instance, terminal members having the same shape (see FIG. 3) are used as the first through third substrate side terminal members 130a to 130c. In other words, terminal members having the same shape are used differently as any one of the first through third substrate side terminal members 130a to 130c. More specifically, a large number of terminal members having the same shape may be manufactured, and there is no need to manufacture terminal members having different shapes.

Further, according to the present embodiment, the third substrate side terminal member 130c protrudes toward a side away from the bearing retaining member. Accordingly, the distance between the third stator side terminal member 100c and the third substrate side terminal member 130c is substantially the same as the distance between the first stator side terminal member 100a and the first substrate side terminal member 130a, and the distance between the second stator side terminal member 100b and the second substrate side terminal member 130b. Therefore, there is no need to manufacture conductive wires having different lengths, and wire materials which are cut at the same length from an elongate twisted wire can be used as any one of the first through third conductive wires 126a to 126c.

Accordingly, it is possible to reduce the cost to manufacture the first through third substrate side terminal members 130a to 130c and the first through third conductive wires 126a to 126c.

Further, in the case that terminal members having different shapes are used in combination, a mistaken assembly is possible in which, for example, a terminal member for the first substrate side terminal member 130a is mistakenly disposed at the position of the second substrate side terminal member 130b. On the other hand, in the case that twisted wires having different lengths are cut, then for example, with a short conductive wire, it may be impossible to bridge such a short conductive wire from the first hook portions 144a to 144c to the third hook portions 162a to 162c. In contrast thereto, in the case that terminal members having the same shape are used as the first through third substrate side terminal members 130a to 130c, and twisted wires which are cut at substantially the same length are used as the first through third conductive wires 126a to 126c, the aforementioned concerns can be dispensed with. Therefore, assembly of the air conditioning blower motor unit 10 can be easily performed.

Next, the conduction unit 124 is attached to the circuit substrate 14. At this time, the bifurcated branched portions 146a to 146c which are exposed above the insulative support member 128 are inserted into three pairs of (six total) through holes that are formed in the circuit substrate 14. Consequently, the conduction unit 124 is positioned with respect to the circuit substrate 14. Further, the position of a non-illustrated fixing screw passage hole that is formed in the circuit substrate 14 is aligned with the position of the screw receiving portion 136.

In this state, the fixing screw 138 is passed through the fixing screw passage hole and is screwed-engaged with the screw hole of the screw receiving portion 136. Consequently, the conduction unit 124 is attached and positioned and fixed on the circuit substrate 14.

Next, the circuit substrate 14 is attached to the support plate 16. More specifically, the mounting screws 110, which have been passed through the mounting screw insertion holes 112 of the circuit substrate 14, are screwed-engaged with the heat sink 64 (on the rear surface of the fins), and the mounting screw holes 66 which are formed at two other locations. Consequently, the circuit substrate 14 is supported on the support plate 16 via the mounting screws 110.

At this time, the third conductive wire 126c crosses over the insulative support member 128 when the circuit substrate 14 is viewed in plan, and the third conductive wire 126c extends toward the bearing retaining member and in close proximity to the third stator side terminal member 100c.

In accordance with such a configuration, according to the present embodiment, it is possible for the third substrate side terminal member 130c and the third stator side terminal member 100c to be separated to a certain extent. More specifically, a situation is avoided in which the third substrate side terminal member 130c and the third stator side terminal member 100c are excessively close to each other. Therefore, it is unnecessary to bend the third conductive wire 126c in a complicated manner. Accordingly, it is possible to avoid a situation in which a deformed portion is formed to such an extent that the third conductive wire 126c interferes with the circuit substrate 14 or the like.

Next, the first through third conductive wires 126a to 126c are appropriately bent, and the other ends of the first through third conductive wires 126a to 126c are fitted in engagement and subjected to electro-deposition on the third hook portions 162a to 162c of the first through third stator side terminal members 100a to 100c. By carrying out electro-deposition in the foregoing manner, the electronic components 120 which are mounted on the circuit substrate 14 are electrically connected to the U-phase electromagnetic coil region 122a, the V-phase electromagnetic coil region 122b, and the W-phase electromagnetic coil region 122c. Moreover, the circuit substrate 14 is indirectly supported on the upper side half body 26 via the support plate 16, and the circuit substrate 14 is not directly connected to the upper side half body 26.

Next, the coupling screws 30 are passed through the coupling screw insertion holes 32 formed in the lower side half body 24, and furthermore, the coupling screws 30 are screw-engaged with the coupling screw insertion holes 48 formed in the upper side half body 26. Consequently, the lower side half body 24 and the upper side half body 26 are connected to each other. Further, at this time, the outer surface of the first fitting portion 36 is covered by the inner surface of the second fitting portion 38, whereby the lower side half body 24 is fitted into the upper side half body 26. In the foregoing manner, the casing 18 is constituted in which the assembly (the circuit substrate 14, the support plate 16, and the brushless motor 12) is accommodated.

Furthermore, by attaching the blower fan 22 (see FIG. 1) to the rotary shaft 20, the air conditioning blower motor unit 10 is obtained. The coupler housing is exposed from the lower side half body 24, and is positioned adjacent to the lower side half body 24.

As described above, the circuit substrate 14 is placed at an offset position where the circuit substrate 14 does not overlap with the rotary shaft 20 as viewed in plan, and therefore, an increase in the dimension in the vertical direction (thickness direction) of the casing 18 can be avoided. Furthermore, since the coupler housing is placed adjacent to the lower side half body 24, it lies within a range of the thickness of the lower side half body 24. Therefore, a situation in which the casing 18 becomes large in the thickness direction is avoided. Accordingly, it is easy to make the air conditioning blower motor unit 10 small in scale.

The air conditioning blower motor unit 10 is mounted on a vehicle body and is incorporated in a vehicle air conditioner. At this time, non-illustrated assembly screws are passed through the stay members 46, and the assembly screws are screw-engaged with a so-called scroll-shaped fan casing (not shown) that is in surrounding relation to a predetermined member, for example, the blower fan 22.

In such a state, the wire harness on the side of the vehicle body is inserted into the coupler housing and is electrically connected to the conductive members. When the vehicle air conditioner is operated, current is supplied to the control circuit from the wire harness via the conductive members.

Along with the supply of current, under the control of the control circuit, the U-phase electromagnetic coil region 122a, the V-phase electromagnetic coil region 122b, and the W-phase electromagnetic coil region 122c are energized through the various electronic components 120 such as capacitors, resistors, switching elements, and the like. As a result, an alternating magnetic field is generated in the stator 56. Attraction and repulsion continuously takes place between this alternating magnetic field and the magnetic fields produced by the permanent magnets 102 constituting the rotor 52, whereby the rotary disc 154 is made to rotate. The rotary shaft 20 and the blower fan 22 are rotated integrally therewith.

Accompanying energization of the control circuit, the electronic components 120 and the circuit substrate 14 take on heat. Such heat is transmitted to the support plate 16 and reaches the heat sink 64 of the support plate 16. Since the heat sink 64 is arranged in close proximity to the circuit substrate 14, the heat from the circuit substrate 14 is rapidly transmitted to the heat sink 64.

Accompanying rotation of the blower fan 22, the air surrounding (and particularly above) the blower fan 22 becomes caught up within a non-illustrated fan casing, and an air current, or in other words, an air flow is created that flows in a centrifugal direction of the blower fan 22, which is a centrifugal fan. A portion of this air flow is introduced into the interior of the casing 18 from the air introduction port 28 that is formed in the duct 44 of the upper side half body 26, and serves as cooling air that flows through the flow passage inside the casing 18.

In this instance, the protrusion 34, which is of a convex shape facing toward the upper side half body 26, is provided in the lower side half body 24. When the cooling air comes into contact with the protrusion 34, the cooling air flows along the inclined upstream side portion thereof. As a result, the direction in which a portion of the cooling air travels is changed toward the side of the upper side half body 26. In this manner, the protrusion 34 serves as a guide member that guides a portion of the cooling air toward the side of the upper side half body 26.

The portion of the cooling air that has traveled to the side of the upper side half body 26 comes into contact with the heat sink 64. Accordingly, the heat sink 64 is quickly cooled. As described above, since heat from the circuit substrate 14 is rapidly transmitted to the heat sink 64, dissipation of heat from the circuit substrate 14 proceeds efficiently through the heat sink 64. In this manner, by providing the protrusion 34 (guide member) in the casing 18 and thereby directing the cooling air toward the heat sink 64, it becomes easy to remove the heat from the circuit substrate 14.

When the heat sink 64 is disposed integrally as a portion of the support plate 16, due to the fact that the entire support plate 16 can be used as a heat radiating member, the heat radiating area can be increased in comparison with a case a the heat sink, which is a separate member, is connected to the support plate 16. Therefore, while making the air conditioning blower motor unit 10 smaller in scale, the circuit substrate 14 can be efficiently cooled.

The cooling air that comes into contact with the heat sink 64 rises along the outer wall of the side wall portion 172 of the rotary disc 154 while being guided on the inner wall of the annular protrusion 50 that constitutes part of the upper side half body 26. At this time, since the cooling air contacts the side wall portion 172, the rotor 52 is cooled from the outside.

A remaining portion of the cooling air flows over the protrusion 34 and flows through a flow passage inside the lower side half body 24, and then rises toward the side of the circuit substrate 14 and the stator 56. After having come into contact with the circuit substrate 14, etc., the cooling air passes through the ventilation holes 80 of the support plate 16, and further passes through gaps formed between the teeth portions that lie adjacent to each other in the circumferential direction of the stator 56. Consequently, the circuit substrate 14, the support plate 16, the brushless motor 12, and the rotor 52 (in particular, the permanent magnets 102 thereof) are cooled.

The cooling air is discharged to the exterior of the casing 18 via a gap between the rotary shaft insertion opening 54 of the upper side half body 26 and the rotary disc 154 of the brushless motor 12, and via the ventilation openings 178 formed in the rotary disc 154. Thereafter, the cooling air flows back into the air flow of the blower fan (centrifugal fan).

Accompanying rotation of the rotary shaft 20, the stator 56 through the inner hole of which the rotary shaft 20 was passed undergoes vibration. Such vibration is transmitted to the first through third conductive wires 126a to 126c via the first through third stator side terminal members 100a to 100c.

In this instance, the first through third conductive wires 126a to 126c are composed of twisted wires and exhibit flexibility. Accordingly, the first through third conductive wires 126a to 126c bend easily accompanying the transmission of vibration. In this manner, the first through third conductive wires 126a to 126c are bent, whereby the vibration is absorbed. In addition, since the first through third conductive wires 126a to 126c are spaced to some extent from the circuit substrate 14 and the like, contact with the circuit substrate 14 when such bending takes place is avoided.

Therefore, transmission of vibrations to the circuit substrate 14, the support plate 16, or the casing 18 is suppressed. Consequently, resonant vibration of the circuit substrate 14 and the casing 18 is avoided, and therefore, the air conditioning blower motor unit 10 can be kept silent.

Even if vibrations are provisionally transmitted to the circuit substrate 14, the insulative support member 128 is connected to the circuit substrate 14 by screw-engagement of the fixing screw 138. Therefore, since the rigidity of the circuit substrate 14 is enhanced, the air conditioning blower motor unit 10 can be further silenced.

Furthermore, the brushless motor 12 and the circuit substrate 14 are spaced apart from the inner wall of the casing 18 by a predetermined distance with the metal support plate 16 being interposed therebetween. Therefore, even in the case that the brushless motor 12 and the circuit substrate 14 vibrate or oscillate, the inner wall of the casing 18 is prevented from interfering with the brushless motor 12 or the circuit substrate 14. In addition, the assembly of the circuit substrate 14, the support plate 16, and the brushless motor 12 is accommodated inside the casing 18. For this reason, noises emitted from the assembly collide with the inner wall of the casing 18, and therefore, it is possible to prevent such noises from being radiated excessively in the surrounding vicinity of the casing 18.

As described above, according to the present embodiment, it is also possible to construct a small sized air conditioning blower motor unit 10 which is superior in terms of quietness. Further, any concerns over the occurrence of contact noises, or concerns over the occurrence of damage to the circuit substrate 14 can be dispensed with, together with improving durability.

Further, since the lengths of the first through third conductive wires 126a to 126c are substantially equivalent, it is possible for the respective phases of the U-phase electromagnetic coil region 122a, the V-phase electromagnetic coil region 122b, and the W-phase electromagnetic coil region 122c to be energized substantially equally. Therefore, it becomes easy to control the rotational speed of the brushless motor by way of a switching control of a power module or the like.

In addition, since the insulative coatings 148 are provided on the first through third conductive wires 126a to 126c, even if the first through third conductive wires 126a to 126c come into contact with the circuit substrate 14, the occurrence of short circuiting between the circuit substrate 14 and the first through third conductive wires 126a to 126c is effectively avoided.

The present invention is not limited in particular to the above-described embodiment, and various modifications can be adopted therein without departing from the essence and gist of the present invention.

For example, in the above-described embodiment, the starting end portion and the terminal end portion of one wire material (winding) is engaged with the second hook portion 160a of the first stator side terminal member 100a, and the one wire material is sequentially bridged over all of the teeth portions so as to form the electromagnetic coils of the stator 56. However, the present invention is not particularly limited to this feature. More specifically, the starting end portion and the terminal end portion may also be engaged with the second hook portion 160b or the second hook portion 160c in a manner so that the wire material is sequentially bridged over the adjacent teeth portions.

Further, the U-phase electromagnetic coil region 122a, the V-phase electromagnetic coil region 122b, and the W-phase electromagnetic coil region 122c may be individually fabricated from a plurality of (for example, three) wire materials. In this case, on each of the first through third stator side terminal members, respectively, there may be formed a hook portion to which an end portion of an arbitrary one phase of the electromagnetic coils is engaged with and subjected to electro-deposition, a hook portion to which an end portion of an electromagnetic coil region of another one phase is engaged with and subjected to electro-deposition, and a hook portion to which an end of any one of the first through third conductive wires 126a to 126c is engaged with and subjected to electro-deposition.

Furthermore, for the first through third conductive wires 126a to 126c, it is also possible to use twisted wires that are not provided with the insulative coatings 148. In this case, an insulating treatment is performed, for example, by disposing a resin insulating material or the like on a circumferential surface of the first bearing holder 74 that faces toward the first through third conductive wires 126a to 126c.

What is claimed is:

1. An air conditioning blower motor unit adapted to rotate a blower fan by a brushless motor having a stator on which there are sequentially provided a U-phase electromagnetic coil region forming a U-phase, a V-phase electromagnetic coil region forming a V-phase, and a W-phase electromagnetic coil region forming a W-phase, each of the electromagnetic coil regions being formed by winding a wire material on insulating materials that cover a stator core, and a rotor in which permanent magnets are retained and that rotates along a circumferential edge of the stator, the air conditioning blower motor unit comprising:
  a metallic bearing retaining member retained by the stator, and rotatably supporting a rotary shaft of the brushless motor;
  a circuit substrate on which there is provided an electronic component adapted to control the brushless motor;
  a support plate on which the bearing retaining member and the circuit substrate are retained at respective positions that do not overlap one another when viewed in plan;
  three stator side terminal members delta-connected with electro-deposited parts that are led out from a boundary region between the U-phase electromagnetic coil region and the V-phase electromagnetic coil region, a boundary region between the V-phase electromagnetic coil region and the W-phase electromagnetic coil region, and a boundary region between the W-phase electromagnetic coil region and the U-phase electromagnetic coil region, on end surfaces of the insulating materials on a side facing toward the circuit substrate, and the three stator side terminal members are disposed in surrounding relation to the bearing retaining member; and
  three substrate side terminal members provided on the circuit substrate and electrically connected to the electronic component; and
  three flexible wire members that electrically connect the three substrate side terminal members and the three stator side terminal members respectively while three substrate side terminal members and the three stator side terminal members are capable of being relatively oscillated, thereby forming an energizing circuit from the circuit substrate to the U-phase electromagnetic coil region, the V-phase electromagnetic coil region, and the W-phase electromagnetic coil region;
  wherein lengths of the three flexible wire members are equivalent to each other, and an end of one of the flexible wire members is arranged in a direction that is separated from the bearing retaining member more so than the remaining two flexible wire members.

2. The air conditioning blower motor unit according to claim 1, further comprising an insulative support member made of resin that is disposed on the circuit substrate, and in which portions of the three substrate side terminal members are embedded;
  wherein remaining portions of two of the substrate side terminal members protrude from a side of the insulative support member that is in close proximity to the bearing retaining member, and a remaining portion of the remaining substrate side terminal member protrudes from a side of the insulative support member that is distanced from the bearing retaining member; and
  the flexible wire member, the end of which is arranged in a direction that is separated from the bearing retaining member more so than the two flexible wire members, crosses over the insulative support member when the circuit substrate is viewed in plan.

3. The air conditioning blower motor unit according to claim 1, wherein the flexible wire members are twisted wires in which a plurality of fine wires are twisted.

4. The air conditioning blower motor unit according to claim 1, wherein an insulative coating is provided on the flexible wire members.

* * * * *